United States Patent
Lamm et al.

(10) Patent No.: US 12,385,593 B1
(45) Date of Patent: Aug. 12, 2025

(54) SYSTEM AND METHOD OF INJECTING INSULATING FOAM PRECURSORS INTO CAVITIES IN A REQUIRED RATIO WITHOUT RELIANCE ON VALVES OR VOLUMETRIC PROPORTIONERS

(71) Applicant: Building Envelope Materials LLC, Lexington, MA (US)

(72) Inventors: Douglas W. Lamm, Lexington, MA (US); Alexander C. Bell, Madbury, NH (US)

(73) Assignee: Building Envelope Materials LLC, Lexington, MA (US)

( * ) Notice: Subject to any disclaimer, the term of this patent is extended or adjusted under 35 U.S.C. 154(b) by 0 days.

(21) Appl. No.: 19/211,927

(22) Filed: May 19, 2025

Related U.S. Application Data

(60) Provisional application No. 63/715,785, filed on Nov. 4, 2024.

(51) Int. Cl.
*F16L 59/02* (2006.01)
*E04B 1/74* (2006.01)
*F16L 59/04* (2006.01)

(52) U.S. Cl.
CPC ............. *F16L 59/028* (2013.01); *E04B 1/74* (2013.01); *F16L 59/04* (2013.01); *E04B 2001/742* (2013.01)

(58) Field of Classification Search
CPC ......... F16L 59/028; F16L 59/04; F16L 59/00; F16L 59/02; E04B 1/74; E04B 2001/742; E04B 1/7604
USPC ............................................ 222/1, 129, 134
See application file for complete search history.

(56) References Cited

U.S. PATENT DOCUMENTS 7,938,148 B2 * 5/2011 Carlier .................. F16L 59/143
141/8

\* cited by examiner

*Primary Examiner* — David J Walczak
(74) *Attorney, Agent, or Firm* — Maine Cernota & Curran

(57) ABSTRACT

A self-contained, mobile precursor dispensing system causes foam precursors to flow from precursor vessels via hoses to a dispensing gun in a required volumetric ratio. Instead of requiring the precursors to flow through a volumetric proportioner, volumetric flow meters, or flow control valves, effective lengths of the hose are configured to cause the precursors to flow in the required volumetric ratio. The effective hose lengths can be configured by selecting hoses having different inner diameters, different physical lengths, and/or different degrees of internal roughness. A compound hose having a desired effective length can be formed by joining together a plurality of hose segments of differing physical properties. The precursor flow rates can be measured by dispensing each precursor separately under identical conditions and weighing the dispensed precursor quantities. Initial precursor volumes and gas-filled head spaces in the vessels can be proportionate to the required volumetric ratio.

19 Claims, 8 Drawing Sheets

SYSTEM AND METHOD OF INJECTING INSULATING FOAM PRECURSORS INTO CAVITIES IN A REQUIRED RATIO WITHOUT RELIANCE ON VALVES OR VOLUMETRIC PROPORTIONERS

RELATED APPLICATIONS

This application claims the benefit of U.S. Provisional Application No. 63/715,785, filed Nov. 4, 2024, which is herein incorporated by reference in its entirety for all purposes.

FIELD OF THE INVENTION

The invention relates to apparatus useful for application of insulation materials, and more particularly, to apparatus useful for dispensing a plurality of foam precursors into building cavities.

BACKGROUND OF THE INVENTION

It is often desirable to increase the thermal insulation of existing buildings, which can reduce their energy usage by as much as 50%. However, most walls, and most ceiling structures, are made up primarily of fully or partially enclosed spaces bounded by wall panels, and by framing members such as rafters, studs, and joists. These enclosed spaces, referred to herein generically as building cavities, or simply as "cavities," are often not directly accessible, and may be poorly insulated.

One approach is to inject insulation into cavities through very small holes that are easily repaired afterward. According to this approach, small, temporary holes are made in either the interior or exterior cavity wall panels, and an insulating material is dispensed or "injected" into the cavities. While there are many different insulating materials that can be injected in this way, it is often desirable, especially for minimally invasive insulation projects, to inject a foam insulation material into a cavity. The insulation can be "pre-foamed," in that it is created and partially or fully expanded before injection into the cavity, or it can be a foam-in-place "pour foam" insulation that forms and expands within the cavity.

According to the foam-in-place approach, at least two components, or "precursors," of the foam are mixed with a controlled volume ratio, and are injected into a cavity. The precursor mixing can take place immediately upon entrance into the cavity or immediately before entrance into the cavity. Once inside of the cavity, the precursors fully react with each other and expand to form the desired quantity of foam insulation.

A common pour foam choice is polyurethane foam, which can be formed by a two-component mixture composed of isocyanate and polyol resin that are mixed near the tip of a dispensing "gun" just before injection into a cavity. It should be noted that the term "pour foam" is used herein generically to refer to any foam that is formed by mixing at least two liquid precursors before, while, or after they are injected into building cavities. It will also be noted that, for simplicity of expression, the term "precursor" is used herein to refer generically to any insulating substance that is injected into a cavity as a reactant of a multi-component foam-in-place material.

At the job site, the insulation foam precursors are typically stored in drums or pressure tanks, which are referred to herein generically as precursor "vessels." In some systems, the precursors flow from the precursor vessels into a volumetric "proportioner" that controls the volumetric mixing ratio of the two precursor components, and then from the proportioner to a dispensing "gun." However, volumetric proportioners tend to be large complex devices that are not easily moved throughout a building.

In other systems, the precursors flow from the precursor vessels through hoses directly to the dispensing gun. This approach generally requires that the precursor flow rates are monitored using volumetric flow meters, and adjusted, when necessary, using flow rate adjustment valves, also referred to herein as flow control valves, to maintain injection of the precursors at the required volume ratio.

Injection of foam precursors into existing cavities requires that the precursors be mixed in precisely the required volume ratio. Otherwise, the resulting foam can suffer from odor, shrinkage, off-gassing, and poor insulation performance.

One approach to ensuring that the precursors are dispensed in the required volumetric ratio is to extend hoses out from the injection sites within the building to exterior tanks that dispense the precursors at flow rates that are held constant by using an external compressor and/or compressed gas supply to stabilize and regulate gas pressures within the external tanks. Another possibility is to dispense the precursors from local precursor vessels that are continuously pressure regulated through hoses that extend to an external compressor and/or compressed gas supply, thereby maintaining constant gas pressures within the local precursor vessels.

However, these approaches add additional cost, weight, and complexity to the dispensing system, and tend to limit the number of injection sites that can be concurrently injected within a given area of a building, thereby significantly increasing the amount of time and cost that are required to complete an insulation project. These approaches can also encounter logistical problems when the hoses must be extended over very long and/or complex routes through the building.

The additional cost, weight, and complexity of extending hoses from external tanks or compressors can be avoided by relying entirely on pre-pressurized local precursor vessels that are not pressure regulated by external tanks or other external apparatus. This approach has the advantage that the precursor vessels can be easily moved from place-to-place within the building, such that the entire insulating apparatus becomes local and essentially self-contained once the precursor vessels are filled and pressurized. When the precursor vessels are disposable, these systems are often referred to as "kit foam." However, refillable precursor vessels can also be used.

Because the precursor vessels in these self-contained systems are not pressure regulated, the precursor flow rates from the local precursor vessels will decrease as the precursors are dispensed, and the pressures within the vessels will consequently be reduced. As noted above, it is usually impractical to employ a volumetric proportioner as part of a mobile, self-contained insulating apparatus. Accordingly, as the local pressures within the precursor vessels decrease, the volumetric dispensing ratio of the precursors will tend to change, due to differences in precursor viscosities and other properties.

In some cases, this problem of changing volumetric flow rates at reduced pressures within the precursor vessels can be mitigated by using positive displacement flow meters. Positive displacement flow meters, also known as "totalizing systems," are placed in direct contact with the precursor fluids and used to measure the total quantity of precursor flow over a given time. As such, they can account for variable flow rates. The measurements made by the positive displacement flow meters can be used to manually or automatically adjust flow control valves. Changes in the flow rate can also be partially mitigated, in some cases, by implementing flow control valves that are configured to provide a constant volumetric flow rate, independent of fluid pressure.

However, because both positive displacement flow meters and flow control valves are in direct contact with precursor fluid, both approaches can suffer from problems due to the tendency of one or both of the precursors to form hardened crystals, which can cause the equipment to fail frequently due to clogging. For instance, gears within positive displacement flow meters frequently stop spinning, in practice, due to isocyanate crystallization. Such equipment failures can significantly disrupt workflow and increase costs.

A much more significant and even more frequent problem that can arise from precursor crystallization is dispensing inaccuracy, in that the system can appear to be working correctly when it is, in fact, providing inaccurate volumetric flow rates, because the crystals are partially jamming the system.

Instead of using valves, another strategy for controlling the precursor volumetric dispensing ratio, which is frequently employed in the kit foam industry, is to provide different initial pressures for precursors having different viscosities and/or other differing flow properties. Typically, a precursor with higher viscosity will be provided with higher initial pressure than a precursor with lower viscosity. For example, an isocyanate precursor with a viscosity of 500 centipoise (cps) might be provided with an initial pressure of 220 psi while a polyol precursor with a viscosity of 800 cps might be provided with an initial pressure of 250 psi.

However, while this approach can succeed initially in causing the precursors to be dispensed in the required volumetric ratio, it cannot maintain the required ratio as the vessels are emptied of their contents, because as the pressures are reduced within the precursor vessels, the pressure difference required to maintain a specified volumetric dispensing ratio changes. For instance, with reference to the above example, the required initial pressure difference when the precursor vessels are full will be 30 psi. However, when the precursor vessels are only half full the pressure difference required to maintain the proper ratio could only be 17 psi. Without using flow meters or flow control valves, it is exceedingly difficult for a technician to continuously monitor and adjust the pressure difference in order to maintain the required volumetric dispensing ratio as the pressures within precursor vessels are reduced.

Yet another strategy for controlling the precursor dispensing ratio is to provide static flow restrictors on one or more of the hoses. A static flow restrictor is a narrow orifice placed at one or more points within the length of the hose. However, flow restrictors suffer from two problems. First, in order to achieve a significant change in flow rate, the orifice must be very small in relation to the inner diameter of the hose. As with flow control valves, this small orifice is subject to frequent jamming with isocyanate crystals. Secondly, small orifices create a significant and sudden pressure drop that can cause the blowing agents within the foam to expand prematurely, which can lead to inconsistent changes in the precursor flow behavior and an inconsistent precursor dispensing ratio. For instance, at a pressure of 200 psi and temperature of 65 F, a precursor might remain as a liquid on both sides of an orifice. However, at 150 psi and 85 F, the precursor might be a liquid on the upstream side of the orifice and a foam on the downstream side. Since foams have much higher viscosities than the liquids from which they are formed, the resulting volumetric ratio at which the precursors are dispensed will be changed significantly.

What is needed therefore is an insulation foam precursor dispensing system that is self-contained and easily moved between injection sites within a building, and that provides reliable dispensing of precursors into cavities in a required volumetric ratio, without relying on positive displacement flow meters, flow control valves, initial pressure differences, static flow restrictors, or volumetric proportioners.

SUMMARY OF THE INVENTION

The present invention is an insulation foam precursor dispensing system that is self-contained and easily moved between injection sites within a building, and that provides reliable dispensing of precursors into cavities in a required volumetric ratio, without relying on positive displacement flow meters, flow control valves, initial pressure differences, static flow restrictors, or volumetric proportioners.

According to the present invention, the disclosed foam injection system comprises a plurality of precursor vessels, a plurality of hoses, and a cavity injection device, sometimes referred to herein generically as a "dispensing gun." It will be noted that the term "dispensing gun" refers generically herein to any device, or arrangement of devices, that receives a plurality of precursors from the precursor vessels via the hoses and injects them into a cavity, wherein the precursors are either mixed immediately before entering the cavity or immediately after entering the cavity. For example, in embodiments, the dispensing gun can include a mixer, dispensing port, and/or injection needle.

Because the disclosed system is self-contained, and is not tethered to a remote pump, proportioner, compressed gas cylinder, or compressor, the pressures of the gases (air, nitrogen, or some other gas or gasses) within the precursor vessels decrease as the precursor materials are dispensed. As a result, the flow rates of the precursor materials are reduced as the precursors are expended. Nevertheless, the disclosed dispensing system does not rely on positive displacement flow meters, flow rate controlling valves, static flow restrictors, or pressure differences to ensure that the precursors are dispensed in the required ratio.

According to the disclosed method, the precursor vessels are filled with initial quantities of the precursors that are selected according to the desired dispensing ratio, and then all of the precursor vessels are pressurized to a common, defined initial pressure. This ensures that as the precursors are dispensed, they will all be subjected to equal propulsive forces during each shot. Rather than requiring a technician to monitor and adjust the precursor flow rates to compensate for continuously changing pressure differences, the pressures in the precursor vessels will tend to naturally remain equal as their contents are dispensed. And if there is any pressure drift between the precursor vessels as the precursors are dispensed, the use of a common, defined pressure requires only that a technician maintain equal pressures within all precursor vessels at all times. For instance, rather than instructing a technician to maintain a 30 psi difference at 200 psi, a 22 psi difference at 150 psi and a 17 psi different at 110 psi, the Technician can simply be instructed to maintain equal pressures in all precursor vessels at all times. In embodiments, the technician is able to re-equalize the pressures in the precursor vessels, when and if necessary, by releasing some of the pressurizing gas and/or by discarding excess precursor from the precursor vessel having the higher pressure.

Instead of relying on pressure differences and periodic valve adjustments, the present invention ensures dispensing of the precursors in the required volumetric ratio by adjusting the flow resistances, also referred to as the "effective lengths," of the hoses that convey the precursors from their vessels to the dispensing gun, such that two or more precursors that are subject to the same internal vessel pressure and have different viscosities and/or other differing physical properties are dispensed in the desired volume ratio. This approach causes the required volumetric dispensing ratio to be maintained as the vessels are emptied.

Any of several approaches can be employed to adjust the effective lengths of the hoses. These include varying the physical lengths of the hoses, and/or varying the inner diameters of the hoses. For example, a hose having an inner diameter of ⅜" has a shorter effective length than an identical hose of ¼" inner diameter. The effective length of a hose can also be adjusted by combining two or more hose segments having different inner diameters into a "compound" hose. This approach enables hose segments having standard inner diameters, such as ¼" and ⅜", to be combined into a compound hose having substantially any desired combination of physical length and flow resistance.

A first general aspect of the present invention is a self-contained, mobile precursor dispensing system suitable for dispensing a plurality of foam precursors mixed in a required dispensing volumetric ratio. T the precursor dispensing system comprises a dispensing gun configured to combine a plurality of foam precursors in a required volumetric ratio into a precursor mixture, and to dispense the precursor mixture, a plurality of precursor vessels, each precursor vessel being configured to contain an initial volume of one of the foam precursors, and to provide a head volume above the contained foam precursor, and a plurality of precursor flow paths configured to provide fluid communication between the precursor vessels and the dispensing gun, each of said precursor flow paths comprising at least one hose, wherein none of said precursor flow paths comprises a volumetric proportioner, a flow meter, or a flow control valve. The effective hose lengths of the hoses are configured according to physical properties of the foam precursors such that when the head spaces of the precursor vessels are equally pressurized with a gas, the dispensing gun will combine the foam precursors into the precursor mixture in the required volumetric ratio. Upon establishing the initial volumes of the foam precursors in the precursor vessels and equal initial gas pressure within the head volumes, the foam precursor dispensing system is disconnected from any external compressed gas cylinders or compressors, the foam precursor dispensing system being thereby self-contained and sufficiently mobile for movement thereof successively into proximity with each of the cavities.

In embodiments, the effective hose lengths of the hoses are configured, at least in part, by configuring inner diameters of the hoses according to the required effective hose lengths.

In any of the above embodiments, the effective hose lengths of the hoses can be configured, at least in part, by configuring physical lengths of the hoses according to the required effective hose lengths.

In any of the above embodiments, the effective hose lengths of the hoses can be configured, at least in part, by selecting hoses having different degrees of internal roughness according to the required effective hose lengths.

In any of the above embodiments, the effective hose lengths of the hoses can be configured, at least in part, by selecting hoses having different inner surface hose materials according to the required effective hose lengths.

In any of the above embodiments, the effective hose lengths of the hoses can be configured, at least in part, by providing at least one of the hoses as a compound hose comprising at least two hose segments having different inner diameters, different degrees of inner surface roughness, and/or different inner surface hose materials.

In any of the above embodiments, the physical properties of the precursors can comprise flow viscosities of the precursors.

A second general aspect of the present invention is a method of preparing a self-contained, mobile precursor dispensing system for dispensing a plurality of foam precursors mixed in a required dispensing volumetric ratio. The method includes:

A) providing a plurality of foam precursors configured, when combined in the required dispensing volumetric ratio, to mutually react and thereby form an insulating foam; each of the foam precursors being characterized by corresponding physical properties thereof;

B) providing a self-contained; mobile precursor dispensing system that comprises a dispensing gun configured to combine and dispense the plurality of precursors; and a plurality of precursor vessels in fluid communication via corresponding precursor flow paths with the dispensing gun; each of said precursor flow paths comprising at least one hose; wherein none of said precursor flow paths comprises a volumetric proportioner, a flow meter, or a flow control valve;

C) establishing initial precursor volumes of each of the foam precursors within corresponding ones of the precursor vessels, a ratio between said initial precursor volumes being equal to the required dispensing volumetric ratio of the precursors;

D) establishing equal internal gas pressures within internal head spaces of the precursor vessels; and E) configuring effective hose lengths of the hoses in view of the physical properties of the foam precursors such that when the gas pressures within the internal head spaces of the precursor vessels are equal, the foam precursors will flow from the precursor vessels to the dispensing gun in the required volumetric ratio.

In embodiments, in step A) the physical properties of the precursors comprise flow viscosities of the precursors.

In any of the above embodiments, in step C) the initial precursor volumes can be proportional to the required dispensing volumetric ratio, and initial volumes of the internal head spaces in the precursor vessels can be proportional to the required dispensing volumetric ratio.

In any of the above embodiments, in step E) configuring the effective hose lengths of the hoses can include selecting inner diameters of each of the hoses according to the required effective hose lengths.

In any of the above embodiments, in step E) configuring the effective hose lengths of the hoses can include selecting physical lengths of the hoses according to the required effective hose lengths.

In any of the above embodiments, in step E) configuring the effective hose lengths of the hoses can include providing at least one of the hoses as a compound hose comprising at least two hose segments having at least one of different inner diameters, different degrees of inner surface roughness, and different inner surface hose materials.

In any of the above embodiments, in step E) configuring the effective hose lengths of the hoses can include:
  a) separately measuring volumetric flow rates of the precursors through each of the hoses under identical conditions;
  b) selecting a first hose of the plurality of hoses, wherein the dispensing apparatus is configured to cause a first precursor of the foam precursors to flow through the first hose to the dispensing gun, and replacing said first hose with a replacement hose having a replacement inner diameter that is different from a first inner diameter of the first hose;
  c) measuring a volumetric flow rate of the first precursor through the replacement hose;
  d) repeating steps b) and c) until the volumetric flow rate of the first precursor through the replacement hose is as close as possible to a desired first volumetric flow rate;
  e) if after step d) the volumetric flow rate of the first precursor through the replacement hose is not equal to the desired first volumetric flow rate, constructing a compound hose according to the measurements made in step c);
  f) measuring a volumetric flow rate of the first precursor through the compound hose; and
  g) if the measured volumetric flow rate of the first precursor through the compound hose is equal to the desired first volumetric flow, installing the compound hose in the precursor dispensing system in lieu of the first hose.

In some of these embodiments, step d) comprises identifying a hose inner diameter IDa for which the measured volumetric flow rate of the first precursor is a closest higher volumetric flow rate as compared to the desired first volumetric flow rate, and identifying a hose inner diameter IDb for which the measured volumetric flow rate of the first precursor is a closest lower volumetric flow rate as compared to the desired first volumetric flow rate.

In some of these embodiments, in step e) the compound hose is a two-component hose that comprises a first segment having length L1 and inner diameter IDa, and a second segment having length L2 and inner diameter IDb, wherein L1+L2 is equal to a total desired physical length of the first hose.

Any of the above embodiments can further include dispensing by a technician of the foam precursors via the dispensing gun into a plurality of cavities. In some of these embodiments said dispensing by a technician of the foam precursors via the dispensing gun into a plurality of cavities comprises monitoring of the gas pressures within the internal head spaces of the precursor vessels as the foam precursors are dispensed, and re-equalizing by the technician of the gas pressures within the internal head spaces as needed.

And in some of these embodiments, said re-equalizing of the gas pressures within the internal head spaces includes at least one of releasing excess gas from the internal head space of at least one of the precursor vessels, and separately dispensing excess precursor from at least one of the precursor vessels.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an insulation foam precursor dispensing system that is self-contained and easily moved between injection sites within a building, and that provides reliable dispensing of precursors into cavities in a required volumetric ratio, without relying on positive displacement flow meters, flow control valves, initial pressure differences, static flow restrictors or volumetric proportioners.

Figure 1:
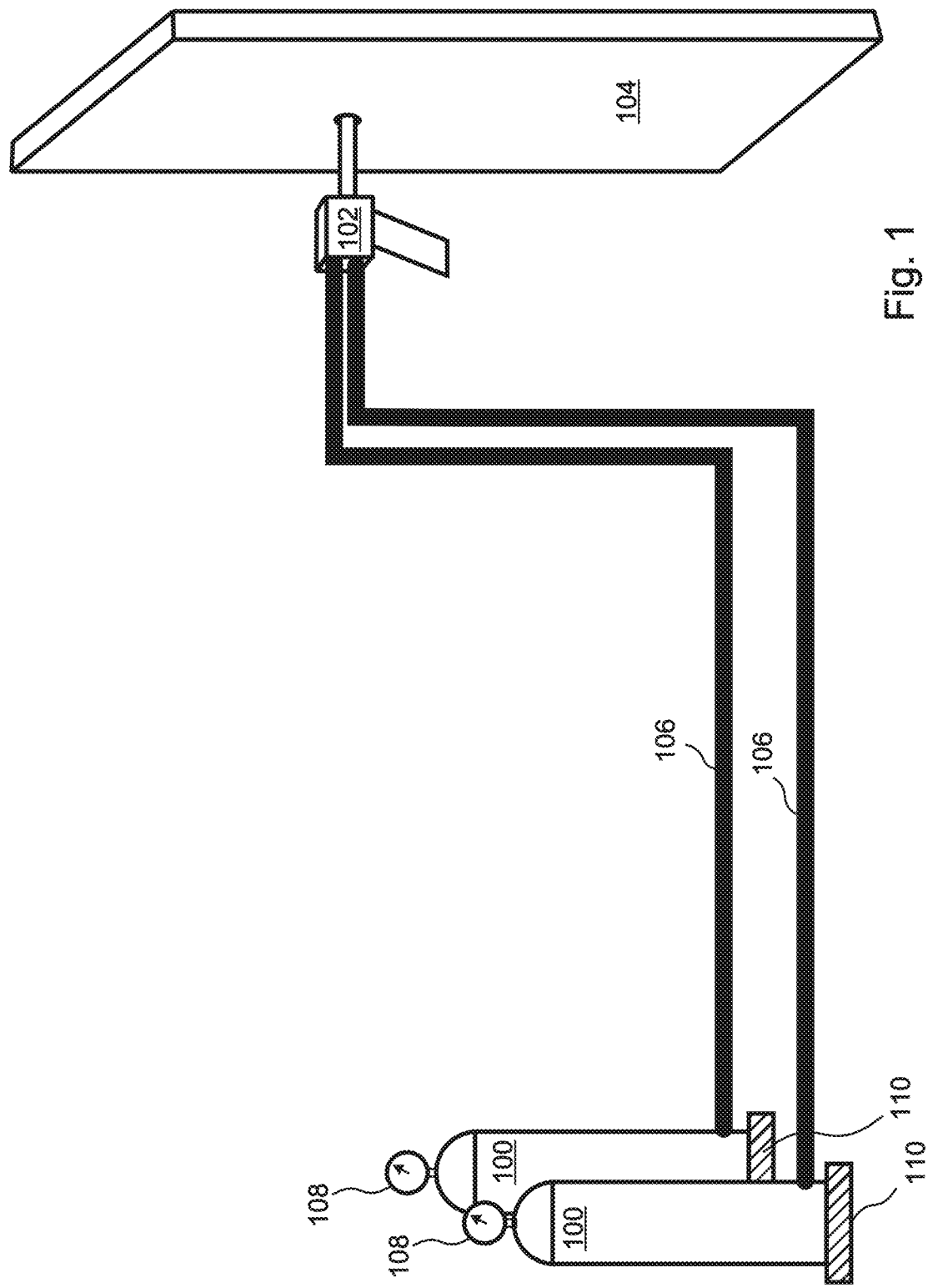
FIG. 1 is a simplified illustration of the components included in an embodiment of the present invention.

With reference to FIG. 1, the disclosed self-contained foam injection system comprises at plurality of pre-pressurized and pre-filled precursor vessels 100, together with a plurality of hoses 106 included in flow paths that provide fluid communication between the precursor vessels 100 and a cavity injection device 102, sometimes referred to herein as a "dispensing gun." It will be noted that the term "dispensing gun" 102 refers herein generically to any device, or arrangement of devices, that receives precursors from the precursor vessels 100 via the hoses 106, and injects the precursors through a cavity panel 104 into a cavity. The dispensing gun 102 can be configured according to the disclosure of U.S. Pat. No. 12,000,139, issued on Jun. 4, 2024, which is by the present Applicant and is incorporated herein by reference in its entirety for all purposes.

It should also be noted that the term "hose," as used herein, refers to any element, or arrangement of elements, having a static internal geometry that conveys a precursor from a precursor vessel 100 to a dispensing gun 102, and that no structures having variable flow resistances, such as valves, are included in the flow paths between the precursor vessels 100 and the dispensing gun 102.

Embodiments include pressure sensors 108 that directly measure the gas pressures within the vessels 100, level sensors (not shown) that measure precursor levels within the precursor vessels, and/or scales 110 that monitor the precursor quantities in the vessels 100 by weighing the vessels 100. Some embodiments further include temperature sensors that monitor the temperatures of the precursors in the precursor vessels 100.

As noted above, when a foam is formed by the reaction together of a plurality of precursors, it is important to ensure that the precursors are dispensed according to a required volumetric ratio. In the simplest case, if two precursors are to be dispensed in equal volumes (precursor ratio=1:1), and if the two precursors have identical physical properties and are dispensed from vessels of equal volume and initial pressurization, then dispensing of the precursors at the required volumetric ratio of 1:1 can be achieved simply by connecting the precursor vessels to the injection "gun" 102 using identical hoses 106.

However, it is much more common that the two precursors have significantly different viscosities, and/or other differing physical characteristics, that affect their flow rates. Also, it is not uncommon for the required dispensing ratio to be something other than 1:1, for example 2:1. As noted above, traditionally in such cases self-contained dispensing systems establish and maintain the required precursor flow ratio by implementing volumetric proportioners, by establishing and maintaining pressure differences between the precursor vessels, by implementing static flow restrictors, and/or by adjusting flow control valves. However, volumetric proportioners are large complex devices that are not easily moved throughout a building, continuously changing pressure differences are difficult to monitor and maintain, static flow restrictors can cause unexpected viscosity changes and flow control valves are subject to clogging and to other failure modes due to crystallization of the precursors.

The present invention excludes flow control valves, pressure differences, static flow restrictors and volumetric proportioners. Instead, the present invention establishes and maintains equal pressures in the precursor vessels 100, and compensates for differing viscosities and/or other differing physical properties of the precursors by adjusting the flow resistances of the hoses 106 that deliver the precursors to the dispensing gun 102, also referred to herein as the "effective lengths" of the hoses 106, thereby ensuring that the precursors are dispensed in the required volumetric ratio.

For example, if two precursors are to be dispensed from vessels 100 of identical volumes in a ratio of 1:1, and if the viscosity of the first precursor is higher than the viscosity of the second precursor, the precursor vessels 100 can be prepared with equal pressures, and the second precursor can be caused to flow through a hose 106 having an effective length, and hence a flow resistance, that is greater than the hose 106 through which the first precursor flows. By performing an initial calibration, an effective length of the second precursor hose 106 can be identified and implemented for which the precursors flow at the same volumetric rate when equal pressures are applied.

Figure 2:
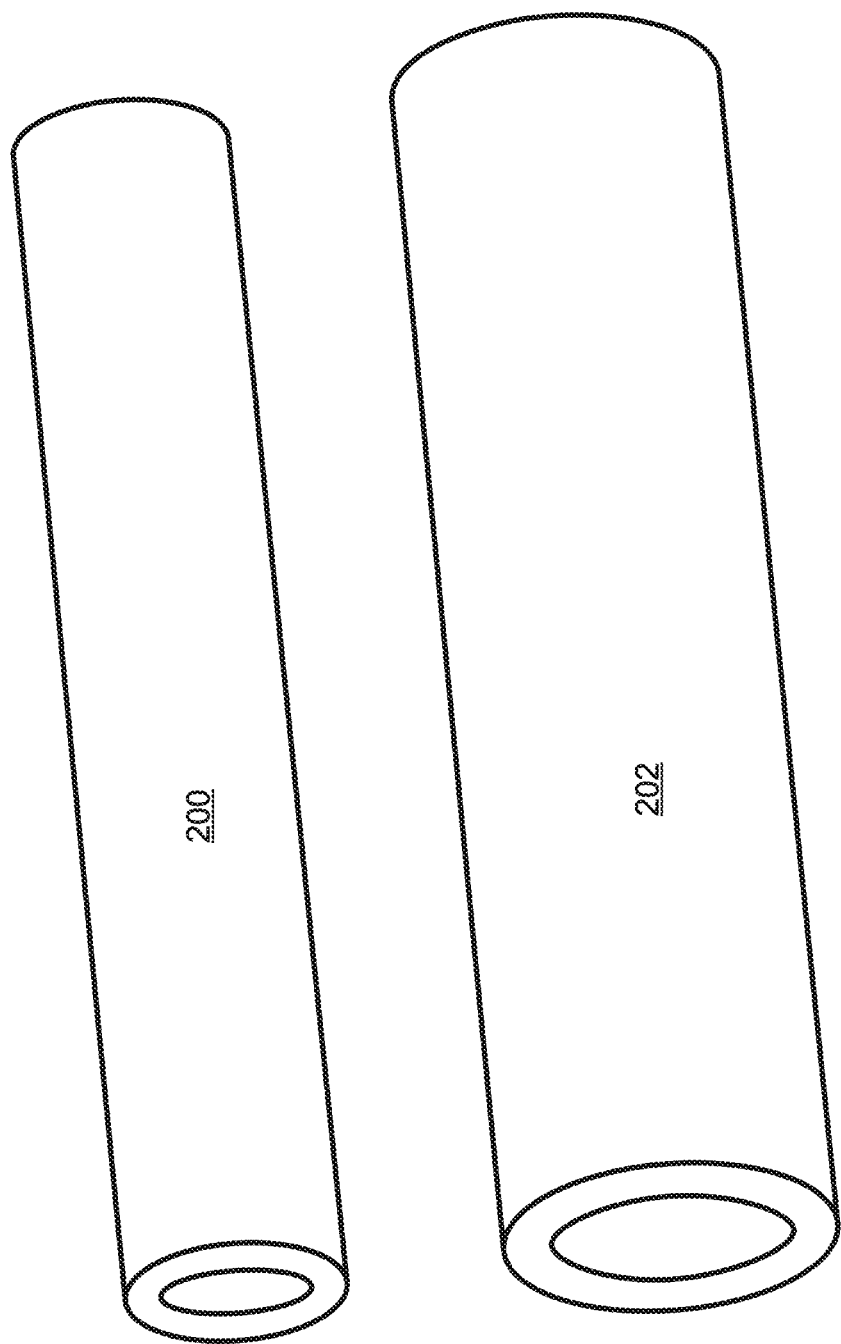
FIG. 2 is a perspective view of a pair of dispensing hoses having different diameters.

In general, the flow resistance of a hose will depend on the diameter of the hose and the physical length of the hose. In embodiments where the precursor flows are not laminar, the inner surface roughness and the inner surface material of each hose may further affect its effective length. In various embodiments of the present invention, any of several approaches are employed to adjust the effective lengths of the hoses. With reference to FIG. 2, in some embodiments, the effective lengths of the hoses 200, 202 are adjusted, at least in part, by connecting the precursor vessels 100 to the dispensing gun 104 using hoses 200, 202 having different inner diameters. However, while this approach is sometimes convenient and effective, the available selection of hose inner diameters can be limited, because hoses 200, 202 are generally available only with certain standard inner diameters, such as ¼", ⅜", ½" etc.

Figure 3A:
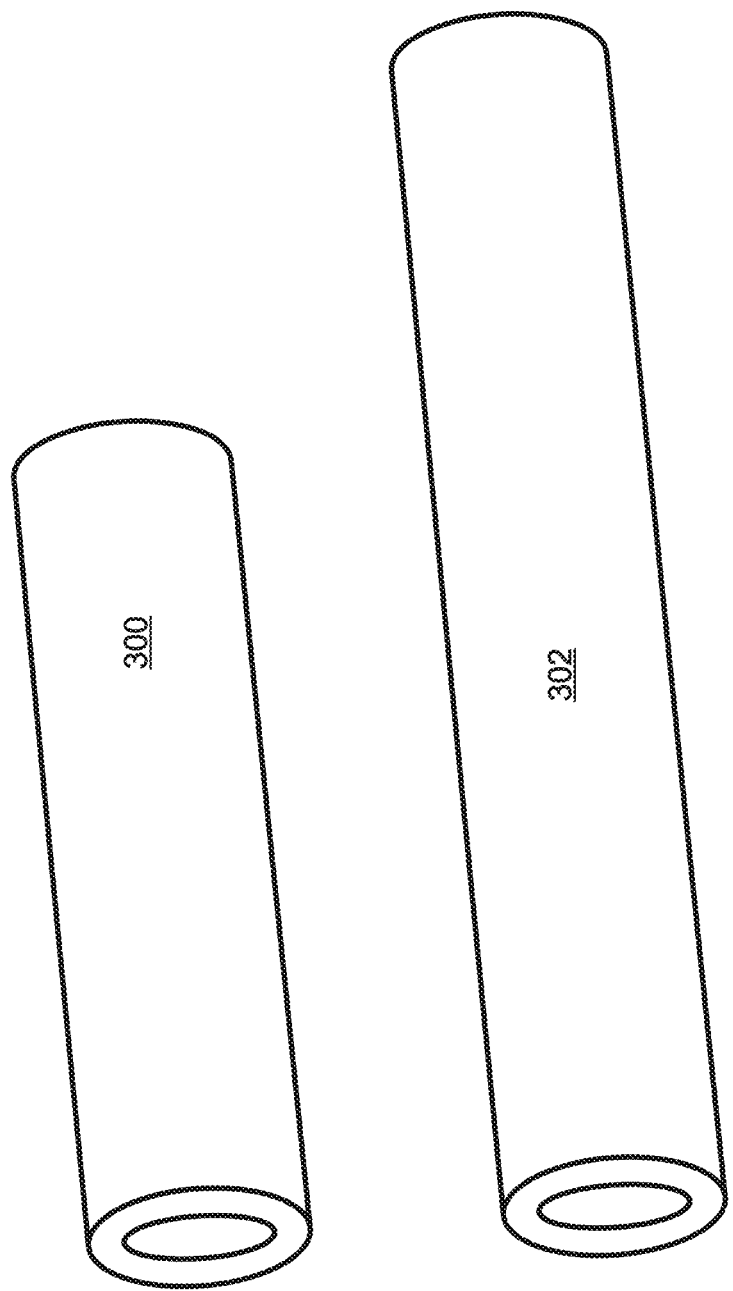
FIG. 3A is a perspective view of a pair of dispensing hoses having different lengths.

Instead, with reference to FIG. 3A, in other embodiments hoses 300, 302 having different physical or "actual" lengths are used. However, while this approach can be effective, it can sometimes be problematic, in that the resulting physical length of at least one of the hoses 302 may be much longer than the length of the shortest hose 300, such that the excess length of the longer hose 302 will add both weight and bulk to the apparatus. For example, a hose reel or other hose supporting device may be required to manage the excess hose length of the longer hose 302.

Figure 3B:
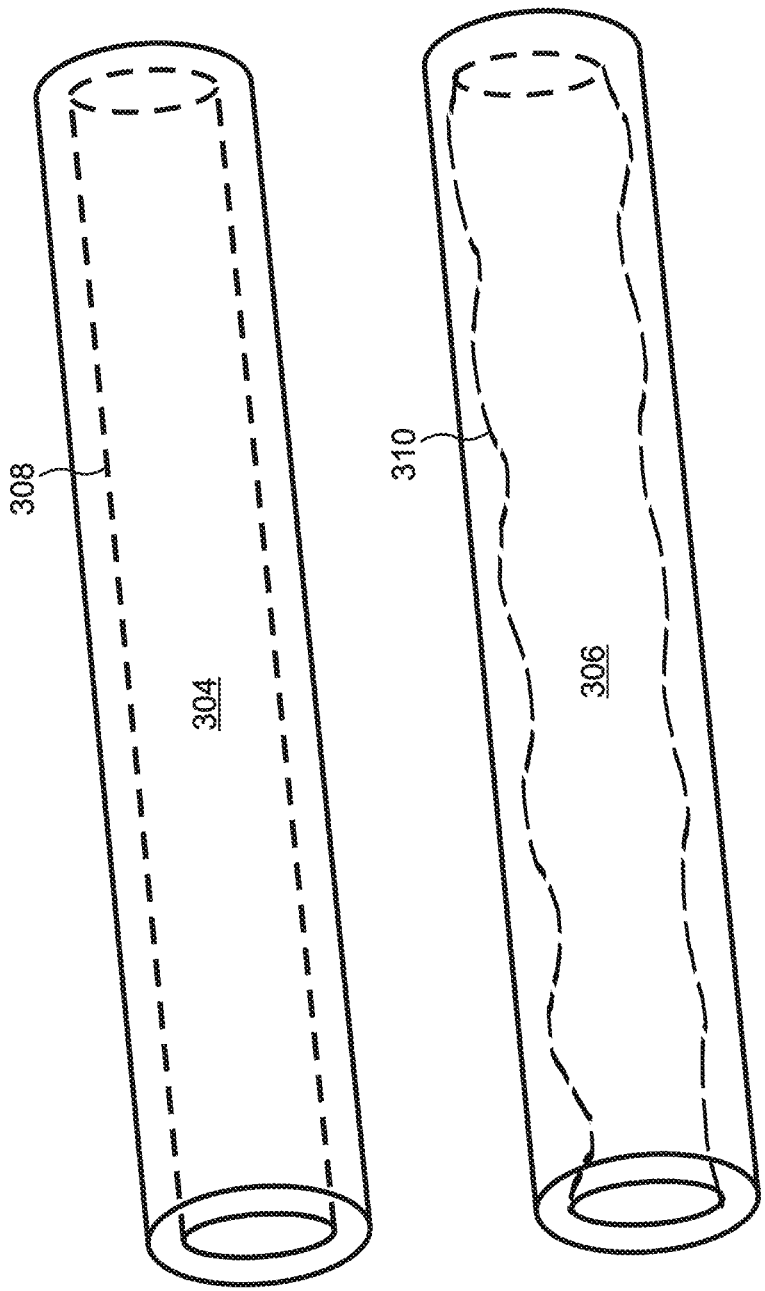
FIG. 3B is a perspective view of a pair of dispensing hoses having different static internal geometries.

With reference to FIG. 3B, in some embodiments a hose 304 having a smooth inner surface 308 can be paired with a hose 306 having a rough or irregular inner surface 310.

Figure 4:
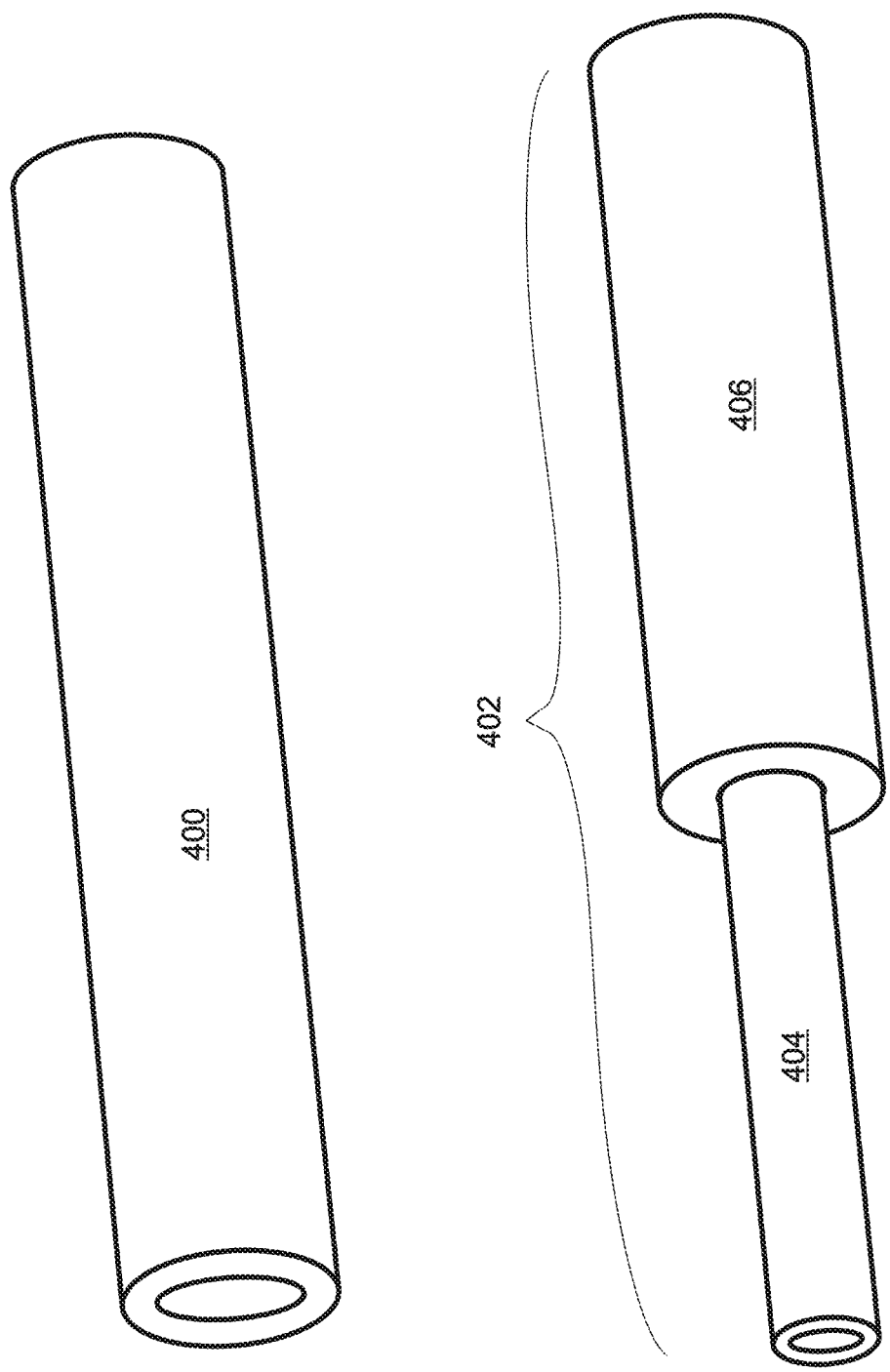
FIG. 4 is a perspective view of a conventional dispensing hose paired with a compound hose having a desired equivalent length arising from a combination of two hose segments having different, standard inner diameters.

With reference to FIG. 4, in still other embodiments at least one of the hoses is a "compound" hose 402 that is used to connect one of the precursor vessels 100 to the dispensing gun 102. As used herein, the term "compound hose" 402 refers to a hose that comprises at least two segments 404, 406 having different inner diameters and/or other differing static geometries that affect fluid flow. In the illustrated embodiment, one of the hoses 402 is a compound hose, while the other 400 is not.

It will be clear to one of skill in the art that the approaches disclosed herein for maintaining a required dispensing ratio of two or more precursors can be practiced in any desired combination.

In embodiments, if the required precursor flow ratio is not 1:1, the volumes of the precursor vessels 100 are adjusted accordingly. For example, if the required dispensing ratio is 2:1, then one of the precursor vessels 100 can be configured to contain twice as much precursor, while having the same initial gas pressurization "head space" as the other precursor vessel 100. Since the initial gas pressures in the precursor vessels 100 will be the same, the pressures in the two vessels 100 will remain equal, and the precursor quantities in the two vessels 100 will decrease with the same proportionality, as the precursors are dispensed. For example, the gas-filled head spaces in both precursor vessels 100 will be doubled at the same time, resulting in pressures in the precursor vessels that are each reduced by one half, and yet remain equal to each other.

Figure 5A:
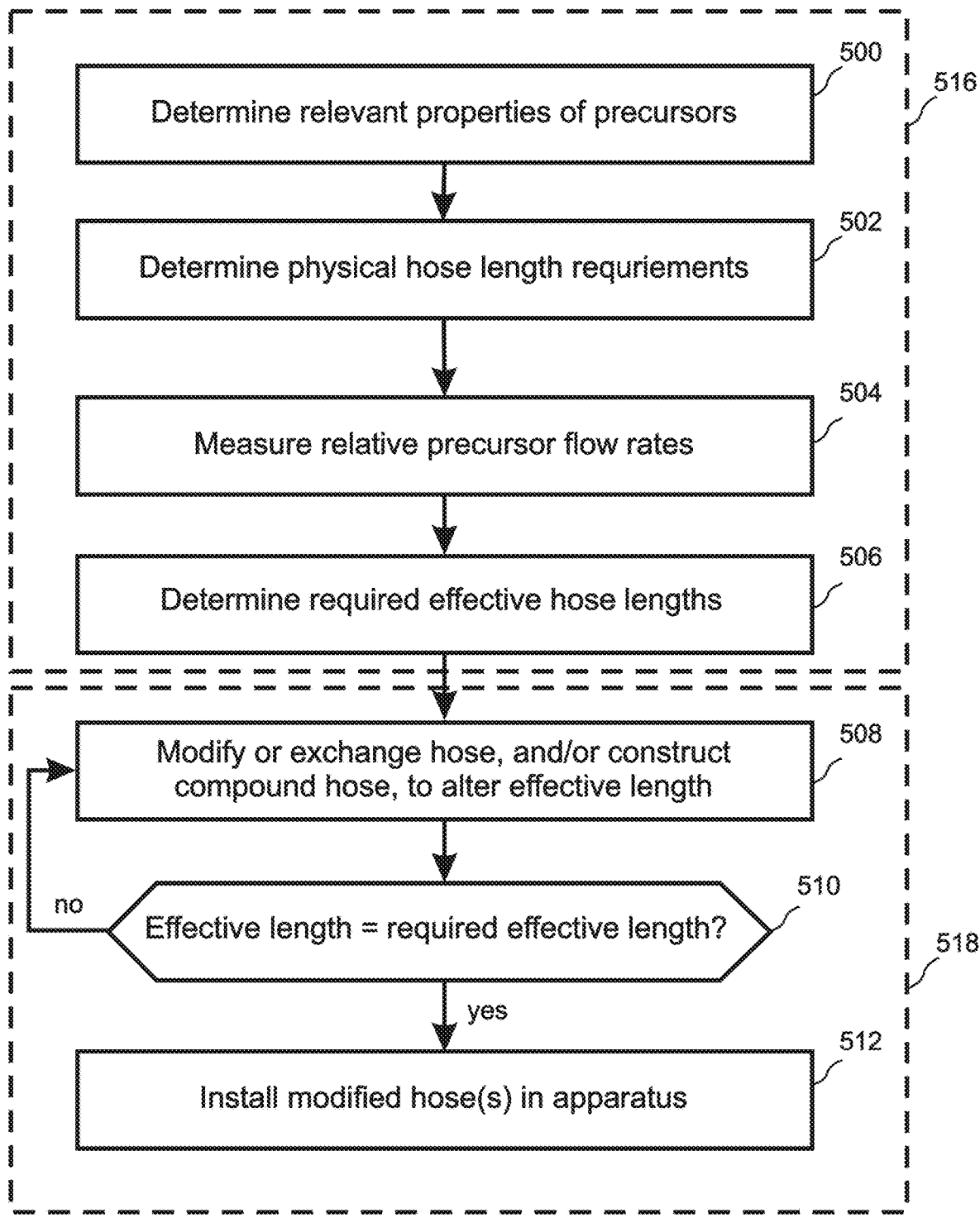
FIG. 5A is a flow diagram that illustrates a method embodiment of the present invention.

FIG. 5A is a flow diagram that illustrates an exemplary method embodiment of the present invention, according to which the disclosed apparatus is prepared for self-contained dispensing of precursors with a required volumetric ratio into wall cavities. The method includes an analysis phase 516, followed by a calibration phase 518.

The analysis phase 516 includes the following steps:

1. Determining relevant physical properties of the precursors 500. This can include determining the specific gravity of each of the precursors, as well as viscosity information and other fluid flow characteristics for each of the precursors.

2. Determining the required "actual" physical hose lengths 502, where the required actual hose lengths are dependent upon measured distances from the precursor vessels to the dispensing gun.

Figure 5B:
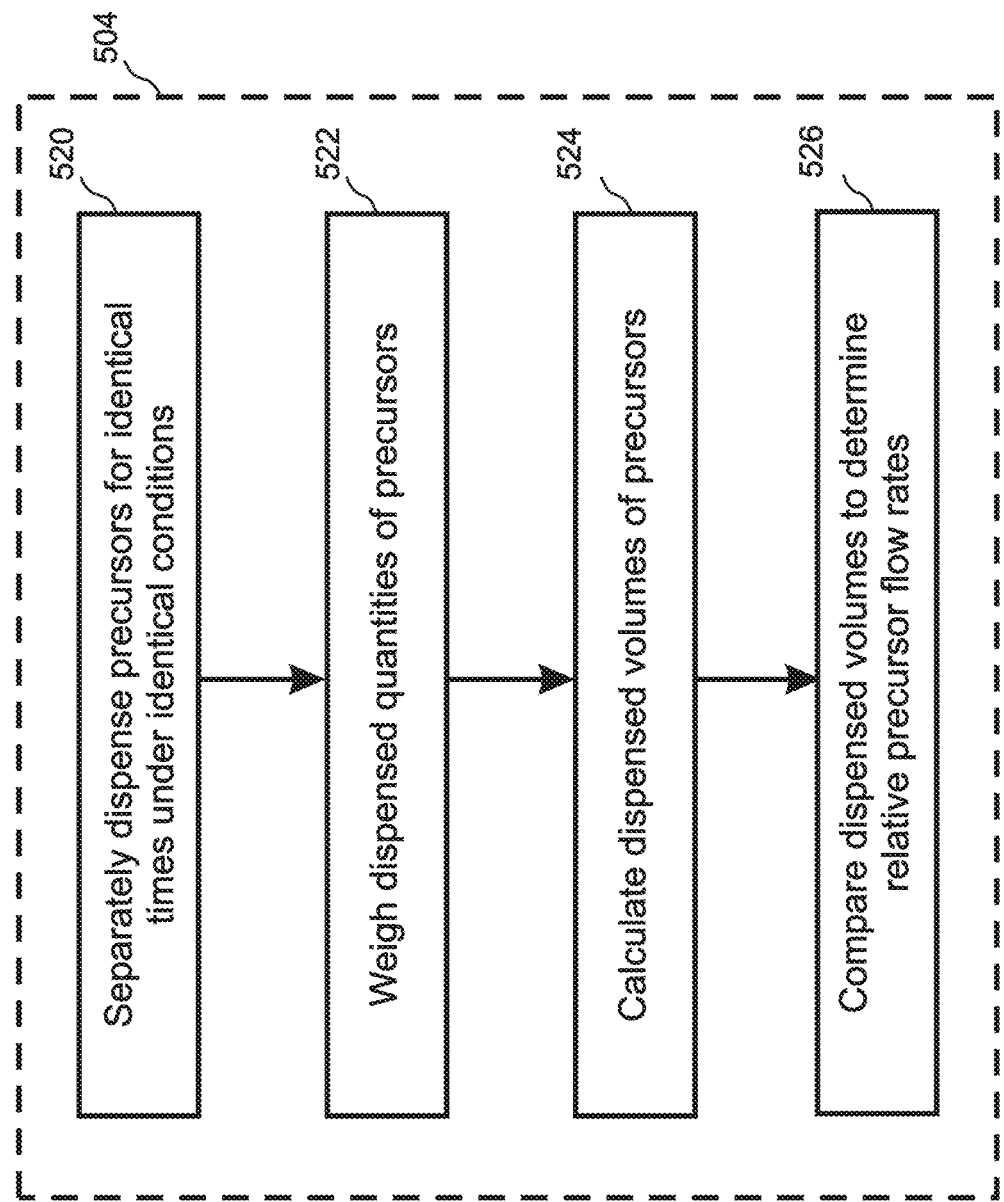
FIG. 5B is a flow diagram that illustrates a method of measuring precursor flow rates according to an embodiment of the present invention.

3. Determining the relative flow rates of the precursors 504. With reference to FIG. 5B, this can include separately dispensing the precursors for equal times through identical hoses under identical pressures 520, weighing the dispensed quantities of the precursors 522, calculating the dispensed volumes of the precursors according to their specific gravities 524, and comparing the differences between the dispensed volumes to determine the relative differences between the volumetric flow rates of the precursors 526. For example, in a 10 second shot, a "high flow" material may dispense 100 grams of material through a ¼" hose while the "low flow" material may dispense only 60 grams through an identical ¼" hose. Assuming (for simplicity) that the specific gravities of the precursors are equal, this would indicate that the volumetric flow rate of the first, "high flow" precursor was 40% faster than the other, "low flow" precursor.

4. Determining the required effective hose lengths 506. In the above example, assuming that the pressures were equal, and assuming that a 1:1 volumetric dispensing ratio was required, the effective hose length for the "high flow" precursor would need to be 40% greater than for the "low flow" precursor.

With continuing reference to FIG. 5A, the calibration phase 518 includes modifying or exchanging at least one hose, and/or constructing and implementing at least one compound hose 508, so as to provide relative effective hose lengths that will result in the desired volumetric flow ratio at equal pressures This step can include a "trial and error" approach, whereby changes are made to the actual lengths, inner diameters, and/or other physical characteristics of at least one of the hoses, the relative flow rates are measured, for example using the method described in Step 3 above, and compared to the required flow rates 510, and then further changes to at least one of the hoses are made 508 until the flow rates have the required ratio, at which point the modified hose or hoses are installed in the apparatus 512. Generally, this includes substituting a hose having a shorter effective length for a precursor having a relatively low flow rate, and/or substituting a hose having a longer effective length for a precursor having a relatively high flow rate. The flow test described above in step 3 can then be repeated to determine the relative volumetric flows when the modified hose is included.

Figure 6:
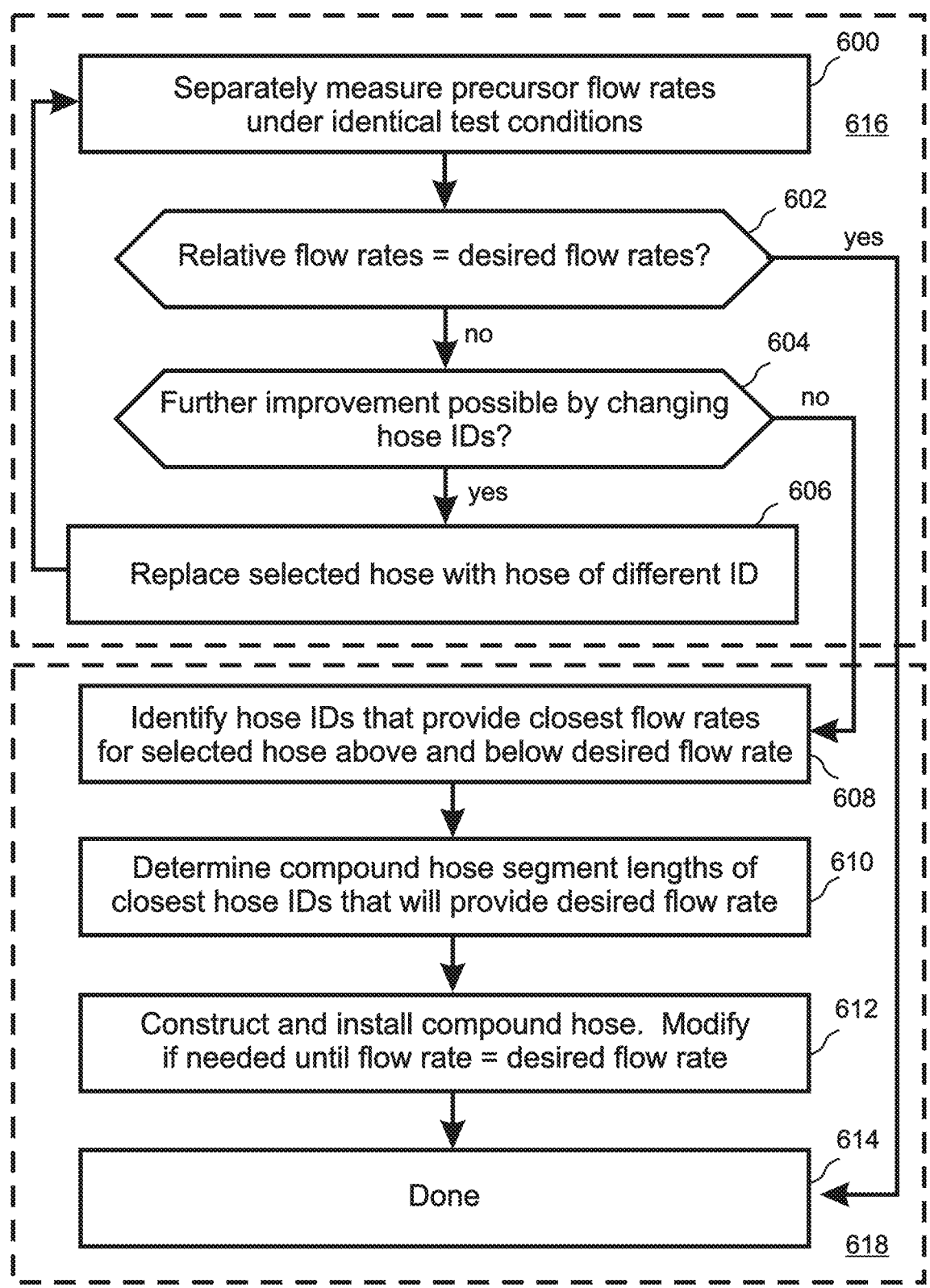
FIG. 6. Is a flow diagram that illustrates a method of providing hoses having required relative precursor flow rates according to an embodiment of the present invention.

With reference to FIG. 6, in embodiments the calibration phase 518 includes exchanging at least one of the hoses with hoses having different inner diameters (IDs) until the hose diameters IDa and IDb have been identified that provide flow rates that are closest above and closest below the desired flow rate, respectively 616. If the desired flow rate is not achieved in this manner, then a compound hose having segments of IDa and IDb can be constructed 618.

In the illustrated embodiment, the calibration phase 518 begins with separately measuring the precursor flow rates under identical conditions 600, for example using the method of separately dispensing and weighing the precursors as described in Step 3 above. If the relative flow rates are not already equal to the desired flow rates 602, then at least one of the hoses 100 can be exchanged for a hose having a different inner diameter (ID) 606.

Continuing the example described above, a ⅜" inner diameter hose might be substituted 606 in place of the ¼" inner diameter hose for use with the precursor having the lower flow rate, and a re-measurement 600 of the flow rates might determine that 100 grams of high flow precursor is again dispensed through the ¼" hose, while 85 grams of low flow precursor is dispensed through the ⅜" hose. Since the dispensed low flow precursor volume remains less than the dispensed high flow precursor volume, and since hoses having even larger IDs are available 604, a hose having an even shorter effective length might be substituted 606. For example, a ½" inner diameter hose could be substituted for the ⅜" inner diameter hose.

If the ½" inner diameter hose causes the low flow hose to dispense 130 grams of material while the high flow material in the ¼" hose is still only dispensing 100 grams, the flow rate of the lower flow precursor now exceeds the flow rate of the higher flow precursor. Since there are no standard hose IDs available between ⅜" and ½", at this point it would not be possible 604 to bring the flow rate of the lower flow precursor closer to its desired flow rate by further exchanging hoses having different IDs. Instead, the hose IDs that provide flow rates that are closest to the desired flow rate will have been identified 608, where IDa=½" provides the closest flow rate that is above the desired rate, and IDb=⅜" provides the closest flow rate that is below the desired rate.

The desired flow rate for the lower flow precursor could then be achieved by determining required lengths of hose segments having hose IDs equal to IDa and IDb which, when combined, will provide the required effective compound hose length 610, preparing the hose segments, and constructing a compound hose 612 that combines segments of IDa and IDb hose in the determined segment lengths.

Once the compound hose is constructed, its flow rate could be measured, and the segment lengths could be adjusted as needed 612 until the desired flow rate for the lower flow precursor was achieved 614.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A self-contained, mobile precursor dispensing system suitable for dispensing a plurality of foam precursors mixed in a required dispensing volumetric ratio, the precursor dispensing system comprising:
   a dispensing gun configured to combine a plurality of foam precursors in a required volumetric ratio into a precursor mixture, and to dispense the precursor mixture;
   a plurality of precursor vessels, each precursor vessel being configured to contain an initial volume of one of the foam precursors, and to provide a head volume above the contained foam precursor; and
   a plurality of precursor flow paths configured to provide fluid communication between the precursor vessels and the dispensing gun, each of said precursor flow paths comprising at least one hose, wherein none of said precursor flow paths comprises a volumetric proportioner, a flow meter, or a flow control valve;
   wherein effective hose lengths of the hoses are configured according to physical properties of the foam precursors such that when the head spaces of the precursor vessels are equally pressurized with a gas, the dispensing gun will combine the foam precursors into the precursor mixture in the required volumetric ratio;

and wherein, upon establishing the initial volumes of the foam precursors in the precursor vessels and equal initial gas pressure within the head volumes, the foam precursor dispensing system is disconnected from any external compressed gas cylinders or compressors, the foam precursor dispensing system being thereby self-contained and sufficiently mobile for movement thereof successively into proximity with each of the cavities.

2. The precursor dispensing system of claim 1, wherein the effective hose lengths of the hoses are configured, at least in part, by configuring inner diameters of the hoses according to required effective hose lengths.

3. The precursor dispensing system of claim 1, wherein the effective hose lengths of the hoses are configured, at least in part, by configuring physical lengths of the hoses according to required effective hose lengths.

4. The precursor dispensing system of claim 1, wherein the effective hose lengths of the hoses are configured, at least in part, by selecting hoses having different degrees of internal roughness according to required effective hose lengths.

5. The precursor dispensing system of claim 1, wherein the effective hose lengths of the hoses are configured, at least in part, by selecting hoses having different inner surface hose materials according to required effective hose lengths.

6. The precursor dispensing system of claim 1, wherein the effective hose lengths of the hoses are configured, at least in part, by providing at least one of the hoses as a compound hose comprising at least two hose segments having different inner diameters, different degrees of inner surface roughness, and/or different inner surface hose materials.

7. The precursor dispensing system of claim 1, wherein the physical properties of the precursors comprise flow viscosities of the precursors.

8. A method of preparing a self-contained, mobile precursor dispensing system for dispensing a plurality of foam precursors mixed in a required dispensing volumetric ratio, the method comprising:
A) providing a plurality of foam precursors configured, when combined in the required dispensing volumetric ratio, to mutually react and thereby form an insulating foam, each of the foam precursors being characterized by corresponding physical properties thereof;
B) providing a self-contained, mobile precursor dispensing system comprising:
a dispensing gun configured to combine and dispense the plurality of precursors; and
a plurality of precursor vessels in fluid communication via corresponding precursor flow paths with the dispensing gun, each of said precursor flow paths comprising at least one hose, wherein none of said precursor flow paths comprises a volumetric proportioner, a flow meter, or a flow control valve;
C) establishing initial precursor volumes of each of the foam precursors within corresponding ones of the precursor vessels, a ratio between said initial precursor volumes being equal to the required dispensing volumetric ratio of the precursors;
D) establishing equal internal gas pressures within internal head spaces of the precursor vessels; and
E) configuring effective hose lengths of the hoses in view of the physical properties of the foam precursors such that when the gas pressures within the internal head spaces of the precursor vessels are equal, the foam precursors will flow from the precursor vessels to the dispensing gun in the required volumetric ratio.

9. The method of claim 8, wherein in step A) the physical properties of the precursors comprise flow viscosities of the precursors.

10. The method of claim 8, wherein in step C) the initial precursor volumes are proportional to the required dispensing volumetric ratio, and initial volumes of the internal head spaces in the precursor vessels are proportional to the required dispensing volumetric ratio.

11. The method of claim 8, wherein in step E) configuring the effective hose lengths of the hoses comprises selecting inner diameters of each of the hoses according to required effective hose lengths.

12. The method of claim 8, wherein in step E) configuring the effective hose lengths of the hoses comprises selecting physical lengths of the hoses according to required effective hose lengths.

13. The method of claim 8, wherein in step E) configuring the effective hose lengths of the hoses comprises providing at least one of the hoses as a compound hose comprising at least two hose segments having at least one of different inner diameters, different degrees of inner surface roughness, and different inner surface hose materials.

14. The method of claim 8, wherein in step E) configuring the effective hose lengths of the hoses comprises:
a) separately measuring volumetric flow rates of the precursors through each of the hoses under identical conditions;
b) selecting a first hose of the plurality of hoses, wherein the dispensing apparatus is configured to cause a first precursor of the foam precursors to flow through the first hose to the dispensing gun, and replacing said first hose with a replacement hose having a replacement inner diameter that is different from a first inner diameter of the first hose;
c) measuring a volumetric flow rate of the first precursor through the replacement hose;
d) repeating steps b) and c) until the volumetric flow rate of the first precursor through the replacement hose is as close as possible to a desired first volumetric flow rate;
e) if after step d) the volumetric flow rate of the first precursor through the replacement hose is not equal to the desired first volumetric flow rate, constructing a compound hose according to the measurements made in step c);
f) measuring a volumetric flow rate of the first precursor through the compound hose; and
g) if the measured volumetric flow rate of the first precursor through the compound hose is equal to the desired first volumetric flow, installing the compound hose in the precursor dispensing system in lieu of the first hose.

15. The method of claim 14, wherein step d) comprises:
identifying a hose inner diameter IDa for which the measured volumetric flow rate of the first precursor is a closest higher volumetric flow rate as compared to the desired first volumetric flow rate; and
identifying a hose inner diameter IDb for which the measured volumetric flow rate of the first precursor is a closest lower volumetric flow rate as compared to the desired first volumetric flow rate.

16. The method of claim 15, wherein in step e) the compound hose is a two-component hose that comprises a first segment having length L1 and inner diameter IDa, and a second segment having length L2 and inner diameter IDb, wherein L1+L2 is equal to a total desired physical length of the first hose.

17. The method of claim 8, further comprising dispensing by a technician of the foam precursors via the dispensing gun into a plurality of cavities.

18. The method of claim 17, wherein said dispensing by a technician of the foam precursors via the dispensing gun into a plurality of cavities comprises monitoring of the gas pressures within the internal head spaces of the precursor vessels as the foam precursors are dispensed, and re-equalizing by the technician of the gas pressures within the internal head spaces as needed.

19. The method of claim 18, wherein said re-equalizing of the gas pressures within the internal head spaces includes at least one of:
   releasing excess gas from the internal head space of at least one of the precursor vessels; and
   separately dispensing excess precursor from at least one of the precursor vessels.

\* \* \* \* \*